Patented Nov. 18, 1924.

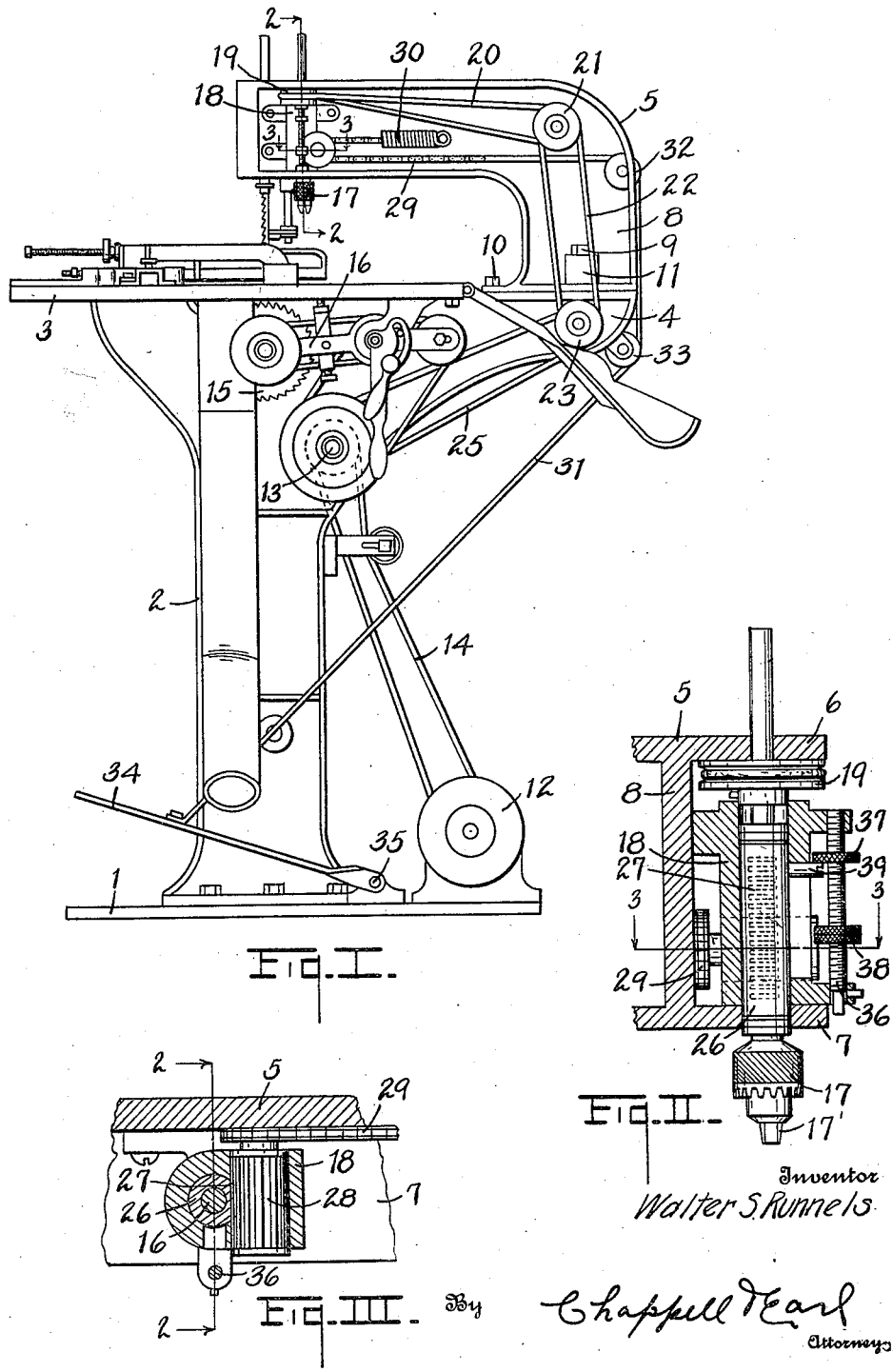

1,515,620

UNITED STATES PATENT OFFICE.

WALTER S. RUNNELS, OF KALAMAZOO, MICHIGAN.

DRILLING AND ROUTING MACHINE.

Original application filed February 18, 1922, Serial No. 537,542. Divided and this application filed March 5, 1923. Serial No. 622,918.

*To all whom it may concern:*

Be it known that I, WALTER S. RUNNELS, a citizen of the United States, residing at the city and county of Kalamazoo, State of Michigan, have invented certain new and useful Improvements in Drilling and Routing Machines, of which the following is a specification.

This invention relates to improvements in drilling and routing machines.

My improvements of this application are especially designed by me for embodiment in sawing and trimming machines of the type shown in my application for Letters Patent filed February 18, 1922, Serial No. 537,542, this application being a division thereof. My improvements are, however, adapted for use in other relations or machines designed for other classes of work.

The main objects of this invention are:

First, to provide a machine of the class described in which the operating mechanism is effectively housed and supported.

Second, to provide in a machine of the class described an improved feed and driving means.

Third, to provide in a machine of the class described an improved frame structure in which the overhanging arm for supporting the drill spindle may be swung to one side to clear the table.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of the invention is clearly illustrated in the accompanying drawing forming a part of this application, in which:

Fig. I is a right hand side elevation of a sawing and trimming machine embodying the features of my invention.

Fig. II is an enlarged detail vertical section on a line corresponding to line 2—2 of Figs. I and III, the parts being shown in full lines for convenience in illustration.

Fig. III is a detail view partially in horizontal section on a line corresponding to line 3—3 of Figs. I and II.

In the drawing the sectional views are taken looking in the direction of the little arrows at the ends of the section lines and similar numerals of reference indicate similar parts in all of the views.

Referring to the drawing, the base 1 is of suitable size to receive the pedestal 2 having a table 3 mounted thereon. The pedestal has a rearwardly projecting bracket arm 4 having an angled arm or head 5 mounted thereon to overhang the rear portion of the table.

This arm or head 5 is of I-beam cross section, the upper and lower flanges or arms 6 and 7 thereof forming a channel like chamber 8 for the housing of parts as will be hereinafter described.

The head 5 is supported by the king or pivot bolt 9 carried by the arm 4 so that it may be swung to operative position as shown in Fig. I or swung to one side to clear the table, it being retained in its operative position by means of the screw 10. The pin 9 engages a boss 11 on the head or arm 5.

The driving motor shown conventionally at 12 is mounted on the base 1 and is connected to a pulley on the shaft 13 by means of the belt 14. The saw 15 mounted on the saw hanger 16 has suitable driving connection to this shaft as is illustrated and described in my application above referred to. As these features form no part of my present invention, they are not further described herein.

The work gauging and holding means is also illustrated and described in detail in my above mentioned application.

The drill and router spindle 17 is provided with a chuck 17'. This spindle is mounted in a bearing 18 disposed in the channel 8 of the head 5. The spindle is provided with a pulley 19 connected by the belt 20 to a pulley 21 disposed at the angle of the head, the pulley 21 being connected by the belt 22 to a pulley 23 mounted on the bracket 4 of the pedestal. This pulley 23 is connected by the belt 25 to a suitable pulley on the shaft 13, thus providing driving connections for the motor to the drill spindle. The pulleys 21 and 23 and the belt 22 are arranged so that that the head or arm 5 may be swung on its pivot 9 without disengaging these driving connections.

The spindle 17 is carried by a sleeve 26 having a rack 27 on one side thereof. A gear or pinion 28 carried by the bearing member 18 meshes with this rack. The gear pinion 28 is driven through the sprocket chain 29, one end of which is connected to the spring 30 and the other to the cable 31 which is passed over the guide pulleys 32, at the rear of the head, and 33 at the rear end of the pedestal arm 4 to the lever 34 pivoted at 35 at the lower end of the pedestal. With this arrangement a downward movement of the lever feeds the spindle downwardly, the spring 30 automatically returning the spindle.

To limit the stroke of the spindle I provide a gauge screw 36 which is supported by the bearing member at the side of the spindle and parallel thereto. This screw is provided with a pair of adjustable stops 37 and 38 which coact with the pin 39 on the spindle sleeve to limit the stroke of the spindle. These drill spindle parts and the driving and feed connections are mainly housed within the channel of the head.

I have illustrated and described an embodiment or adaptation of my improvements which I find very practical. I have not attempted to illustrate or describe other embodiments or adaptations which I contemplate as I believe the disclosure made will enable those skilled in the art to which my invention relates to embody or adapt the same as may be desired.

Having thus described my invention what I claim as new and desire to secure by Letters Patent is:

1. In a structure of the class described, the combination of a pedestal provided with a rearwardly projecting bracket, a table mounted on said pedestal, an angled head having a channeled side mounted on said bracket to overhang said table, a spindle bearing mounted on said head within the channel, a spindle provided with a sleeve mounted in said bearing, said spindle sleeve having a rack thereon, a feed pinion coacting with said rack, a stop pin on said sleeve, a screw disposed at the side of said spindle, stop nuts on said screw adapted to coact with said stop pin, driving connections for said spindle, means for driving said feed pinion comprising a sprocket wheel on said pinion, a sprocket chain to coact therewith, a spring mounted on said head and connected to one end of said chain, a cable connected to the other end of said chain, an operating lever to which said cable is connected, and guide pulleys for said cable mounted at the rear of said head and on said pedestal bracket.

2. In a structure of the class described, the combination of a pedestal, a table mounted on said pedestal, a head mounted on said pedestal to overhang said table, a spindle bearing mounted on said head, a spindle provided with a sleeve mounted in said bearing, said spindle having a rack thereon, a feed pinion coacting with said rack, a stop pin on said sleeve, a screw disposed at the side of said spindle, stop nuts on said screw adapted to coact with said stop pin, driving connections for said spindle, means for driving said feed pinion comprising a sprocket wheel on said pinion, a sprocket chain to coact therewith, a spring mounted on said head and connected to one end of said chain, a cable connected to the other end of said chain, and an operating lever to which said cable is connected.

3. In a structure of the class described, the combination of a pedestal provided with a rearwardly projecting bracket, a table mounted on said pedestal, an angled head having a channeled side mounted on said bracket to overhang said table, a spindle bearing mounted on said head within the channel, a spindle provided with a sleeve mounted in said bearing, said spindle having a rack thereon, a feed pinion coacting with said rack, driving connections for said spindle, means for driving said feed pinion comprising a sprocket wheel on said pinion, a sprocket chain to coact therewith, a spring mounted on said head and connected to one end of said chain, a cable connected to the other end of said chain, an operating lever to which said cable is connected, and guide pulleys for said cable mounted at the rear of said head and on said pedestal bracket.

4. In a structure of the class described, the combination of a pedestal, a table mounted on said pedestal, a head mounted on said pedestal to overhang said table, a spindle bearing mounted on said head, a spindle provided with a sleeve mounted in said bearing, said spindle having a rack thereon, a feed pinion coacting with said rack, a screw disposed at the side of said spindle, stop nuts on said screw adapted to coact with said stop pin, driving connections for said spindle, means for driving said feed pinion comprising a sprocket wheel on said pinion, a sprocket chain to coact therewith, a spring mounted on said head and connected to one end of said chain, a cable connected to the other end of said chain, and an operating lever to which said cable is connected.

5. In a structure of the class described, the combination of a pedestal provided with a rearwardly projecting bracket, a table mounted on said pedestal, an angled head having a channeled side mounted on said bracket, said bracket being provided with a pivot engaging said head whereby the head is pivotally supported, there being screws coacting with said pivot for supporting said head in operative position overhanging said table, a spindle provided with a pulley mounted on said head, the pulley being disposed within the channel of said head member, a driven pulley mounted at the rear of said head within said channel, a belt connecting said driven pulley to said spindle pulley disposed within said channel, a pulley on said bracket, a belt connecting said pulley on said bracket to said pulley on said head, and driving connections for said pulley on said bracket mounted on said pedestal whereby the said parts are mainly housed within the channel of the head and the swinging of the head is permitted.

6. In a structure of the class described, the combination of a pedestal, a table mounted on said pedestal, an angle head, said pedestal being provided with a pivot engaging said head whereby the head is pivotally supported, a spindle provided with a pulley mounted on said head, a driven pulley mounted at the rear of said head, a belt connecting said driven pulley to said spindle pulley, a pulley on said pedestal, a belt connecting said pulley on said pedestal to said pulley on said head, and driving connections for said pulley on said bracket mounted on said pedestal.

7. In a structure of the class described, the combination of a pedestal provided with a rearwardly projecting bracket, a table mounted on said pedestal, an angled head of channel cross section resting on said bracket of said pedestal, said bracket being provided with a pivot pin engaging said head whereby the head is pivotally supported, there being a screw coacting with said pivot for supporting said head in operative position to overhang said table, a spindle mounted on said head, and driving connections therefor mounted in the channel of said head, said driving connections being disposed to permit the swinging of said head on its pivot.

8. In a structure of the class described, the combination of a pedestal provided with a rearwardly projecting bracket, a table mounted on said pedestal, an angled head of channel cross section mounted on said bracket to overhang said table, a spindle mounted on said head, and driving connections therefor disposed in the channel of said head.

9. In a structure of the class described, the combination of a pedestal, a table mounted on said pedestal, an angled head, said pedestal being provided with a pivot engaging said head whereby the head is pivotally supported, a spindle provided with a pulley mounted on said head, a belt connecting said driven pulley to said spindle pulley, a pulley on said pedestal connected to said pulley on said head, and driving connections for said pulley on said bracket mounted on said pedestal.

In witness whereof, I have hereunto set my hand and seal.

WALTER S. RUNNELS. [L. S.]